(12) United States Patent
Chen

(10) Patent No.: US 7,119,793 B2
(45) Date of Patent: Oct. 10, 2006

(54) MOUSE STRUCTURE

(76) Inventor: Cliff Chen, 4F, No. 22, Sec. 6, Hsin I Rd., Taipei (TW)

( * ) Notice: Subject to any disclaimer, the term of this patent is extended or adjusted under 35 U.S.C. 154(b) by 484 days.

(21) Appl. No.: 10/687,665

(22) Filed: Oct. 20, 2003

(65) Prior Publication Data

US 2005/0083302 A1 Apr. 21, 2005

(51) Int. Cl.
  *G09G 5/08* (2006.01)
(52) U.S. Cl. .................................... 345/166
(58) Field of Classification Search ........... 345/166, 345/156–163
  See application file for complete search history.

(56) References Cited

U.S. PATENT DOCUMENTS 6,225,981 B1 * 5/2001 Lu .............................. 345/164
6,411,281 B1 * 6/2002 Sasselli et al. ............... 345/163
6,466,154 B1 * 10/2002 Kim et al. .................... 341/176
6,844,872 B1 * 1/2005 Farag et al. .................. 345/163
2002/0158837 A1 * 10/2002 Hou ............................. 345/156

* cited by examiner

*Primary Examiner*—Amr A. Awad
*Assistant Examiner*—Donna Lui
(74) *Attorney, Agent, or Firm*—Rosenberg, Klein & Lee

(57) ABSTRACT

An improved mouse structure has a cover and a base pivotally connected to the cover. The cover is an elliptically curved shell with two ends, and has a pivoting portion extending downwardly from one of the ends thereof as well as a hook formed on another end thereof. The base comprises a receiving portion formed on an end thereof for receiving the pivoting portion, an engaging seat formed on another end thereof, and an engaging hole formed in the engaging seat for engaging with the hook.

10 Claims, 7 Drawing Sheets

MOUSE STRUCTURE

BACKGROUND OF THE INVENTION

1. Field of the Invention

The present invention relates to an improved mouse structure, and particularly to a compact wireless optical mouse with improved arrangement of the inner elements for convenient carrying.

2. Description of the Prior Art

With the Windows operating system, the mouse has become an essential and indispensable computer peripheral. The mouse can be classified according to its function into two types, the optical mouse and mechanism mouse, and each type is further dividable into the wired and wireless mouse. The wireless optical mouse utilizes light for sensing movement of the mouse, and the power consumption is consequently much more and thus this mouse requires frequent battery replacement. Referring to FIG. 1, the prior art battery device can be classified as two kinds. In the first kind, the mouse 80 is formed with a battery chamber 82 on a bottom thereof, and a detachable cover 84 covers the battery chamber 82. In the second kind, the mouse 90 is formed with a battery chamber 92 on a top thereof, and a detachable cover (not shown) covers the battery chamber 92.

The conventional wireless optical mouse has the following disadvantages:

1. The battery arrangement occupies a lot of space. When the battery is arranged on the bottom of the first kind mouse, the other elements must be disposed on the battery, and therefore the overall volume of the mouse must be increased. This results in inconvenience when carrying, and is contrary to the wireless and unrestricting trend.

2. The mouse has one more cover. This additional cover requires not only a lot of attention to engaging the cover on the battery chamber when replacing the battery, but also one more die for molding the cover. The whole cost and assembling time are increased.

3. The upper and lower shell (85, 86) of mouse are usually assembled by screwing or engaging with some hooks and grooves. This also consumes time when assembling the mouse.

Therefore, the present invention according to the disadvantages of the prior art provides a wireless optical mouse for convenient carrying and assembling as well as ease of changing the battery.

SUMMARY OF THE INVENTION

An object of the present invention is to provide an improved mouse structure that improves the arrangement of inner elements for achieving a compact mouse.

It is another object of the invention to provide an improved mouse structure with an improved method of assembly that is fast and allows convenient battery changing, thus reducing production cost and assembly time.

In order to achieve the above objects, the present invention of improved mouse structure comprises a cover, and a base that pivotally connects with the cover. The cover is an elliptically curved shell with two ends, which comprises a pivoting portion extending downwardly from one of the ends thereof, and a hook formed on another end thereof. The base comprises a receiving portion formed on an end thereof for receiving the pivoting portion, an engaging seat formed on another end thereof, and an engaging hole formed in the engaging seat for engaging with the hook.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
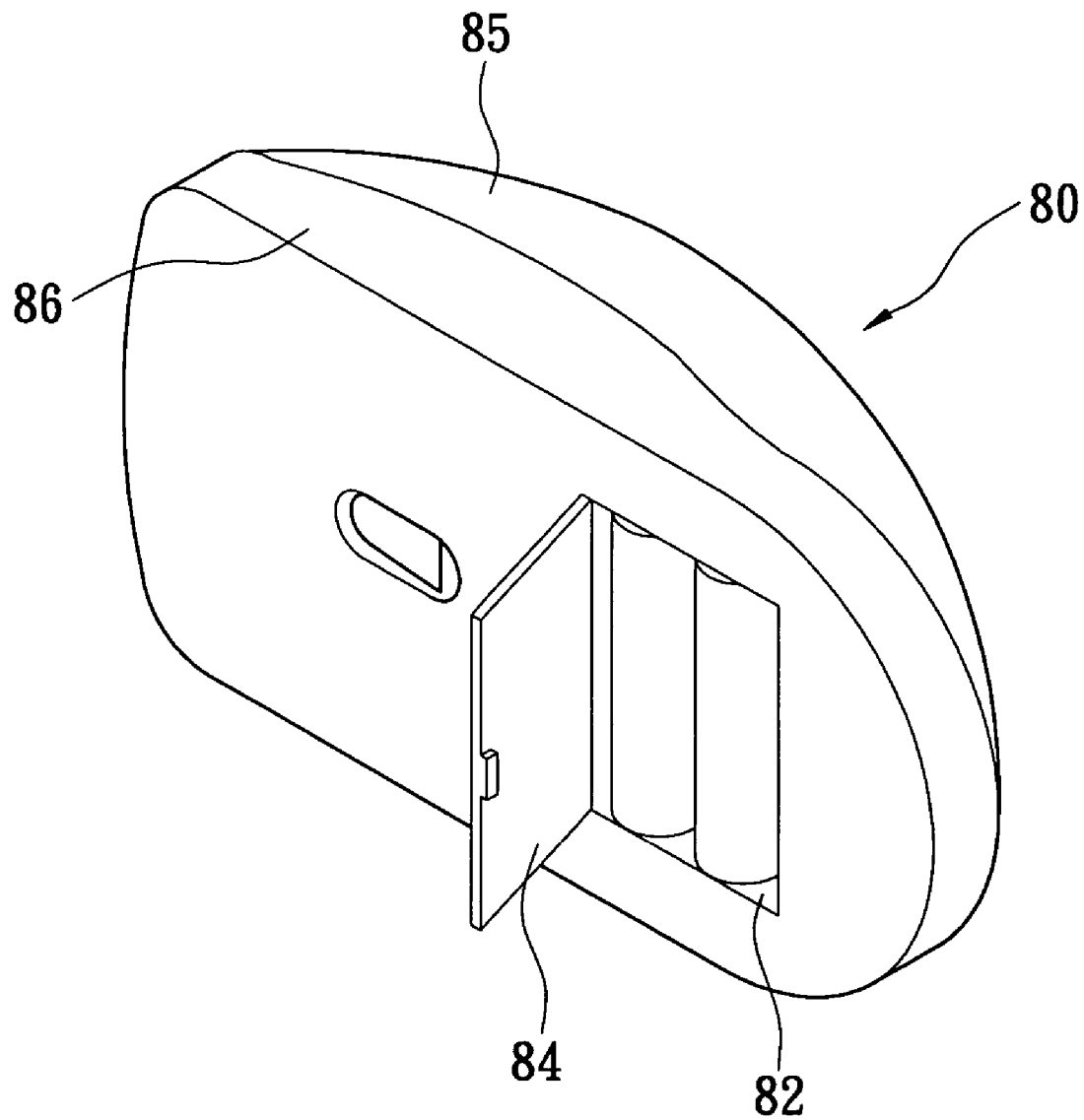
FIG. 1 is a perspective view of a wireless optical mouse in accordance with the prior art.
Figure 2:
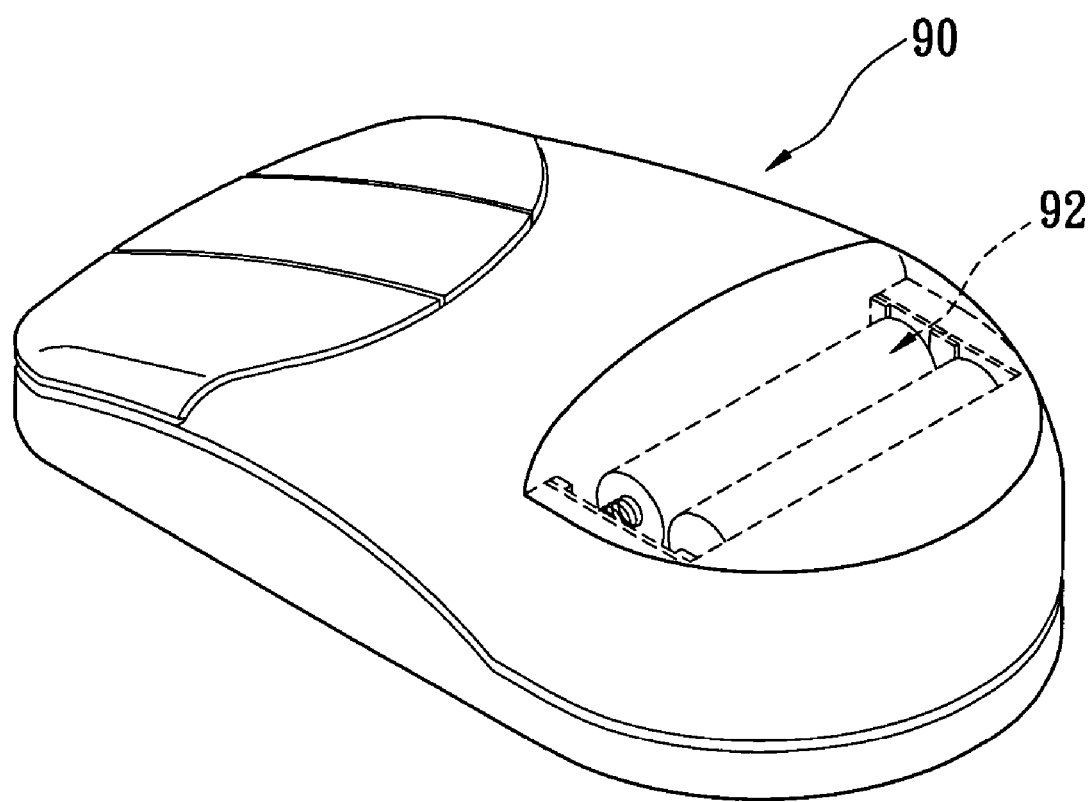
FIG. 2 is a perspective view of another wireless optical mouse of the prior art.
Figure 3:
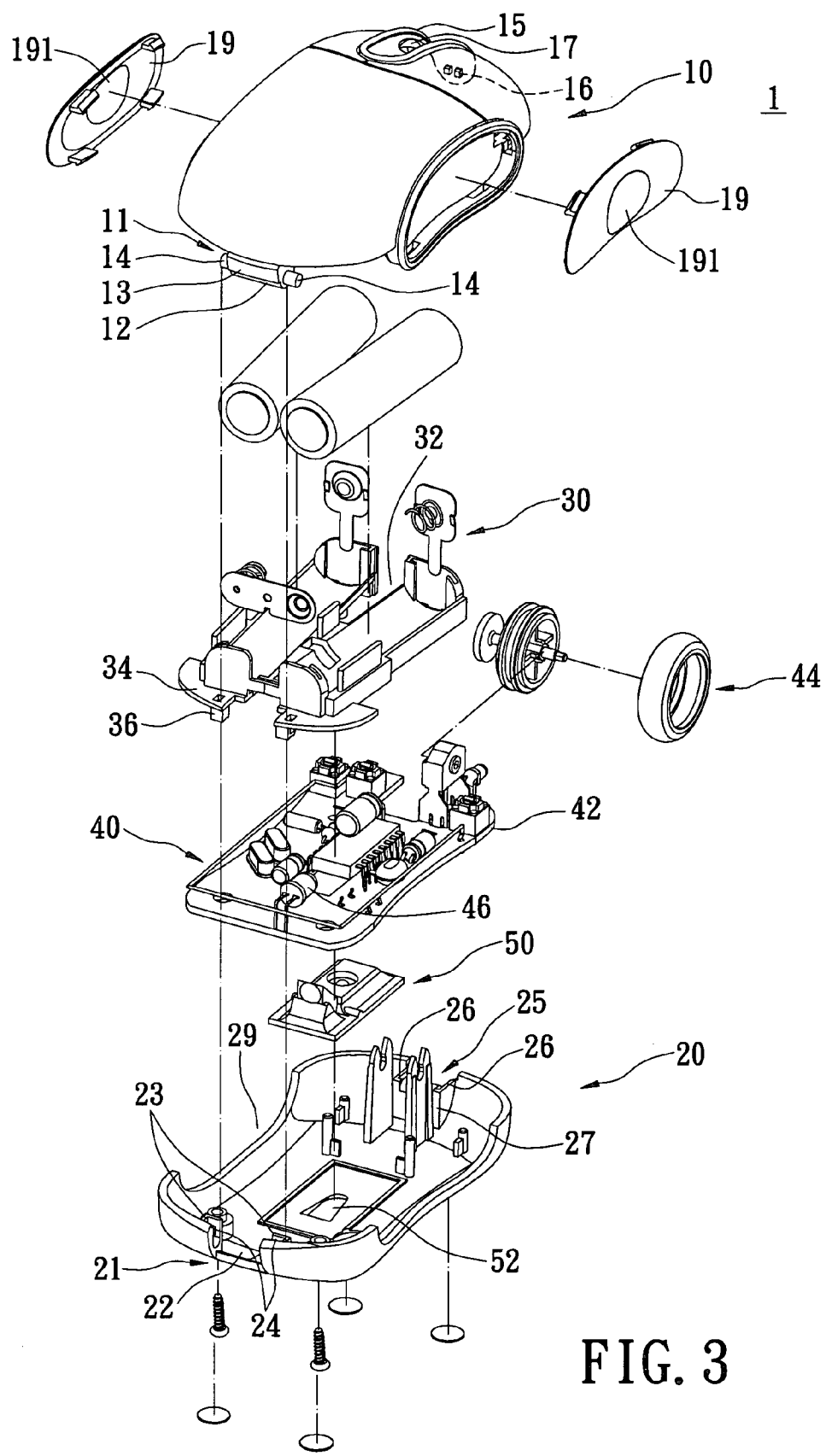
FIG. 3 is an exploded perspective view of an improved mouse structure of the present invention.

Referring to FIGS. 3 to 7, the present invention of an improved mouse structure 1 comprises a cover 10 and a base 20 pivotally assembled on the cover 10.

The cover 10 is an elliptically curved shell with two ends, comprising a pivoting portion 11 extending downwardly from one of the ends thereof, and a saddle 15 formed on a front portion thereof. The pivoting portion 11 has an extending portion 12 extending downwardly from an edge of the cover 10, and a pair of pivoting shafts 14 respectively protruding outwardly from two ends of the extending portion 12. The saddle 15 has a wheel hole 17 formed thereon for containing and projecting a wheel 44. The saddle 15 extends forwardly and downwardly for a predetermined length with a distal end and a hook 16 protrudes from an inner surface of the distal end of the saddle 15.

The base 20 comprises a receiving portion 21 formed on an end thereof for receiving the pivoting portion 11, an engaging seat 25 formed on another end thereof, and an engaging hole 280 formed on the engaging seat 25 for engaging with the hook 16.

The receiving portion 21 of the base 20 has a central recess 22 for containing the extending portion 11, and two U-shaped seats 23 respectively formed on two sidewalls adjacent to the central recess 22. Each of the U-shaped seats 23 is formed with a slot 24 for receiving the pivoting shafts 14 of the pivoting portion 11 therein.

The pivoting portion 11 further comprises a stopping portion 13 protruding outwardly from an outside edge thereof; therefore, when the cover 10 is opened, the stopping portion 13 can stop the cover 10 at a predetermined angle.

Figure 4:
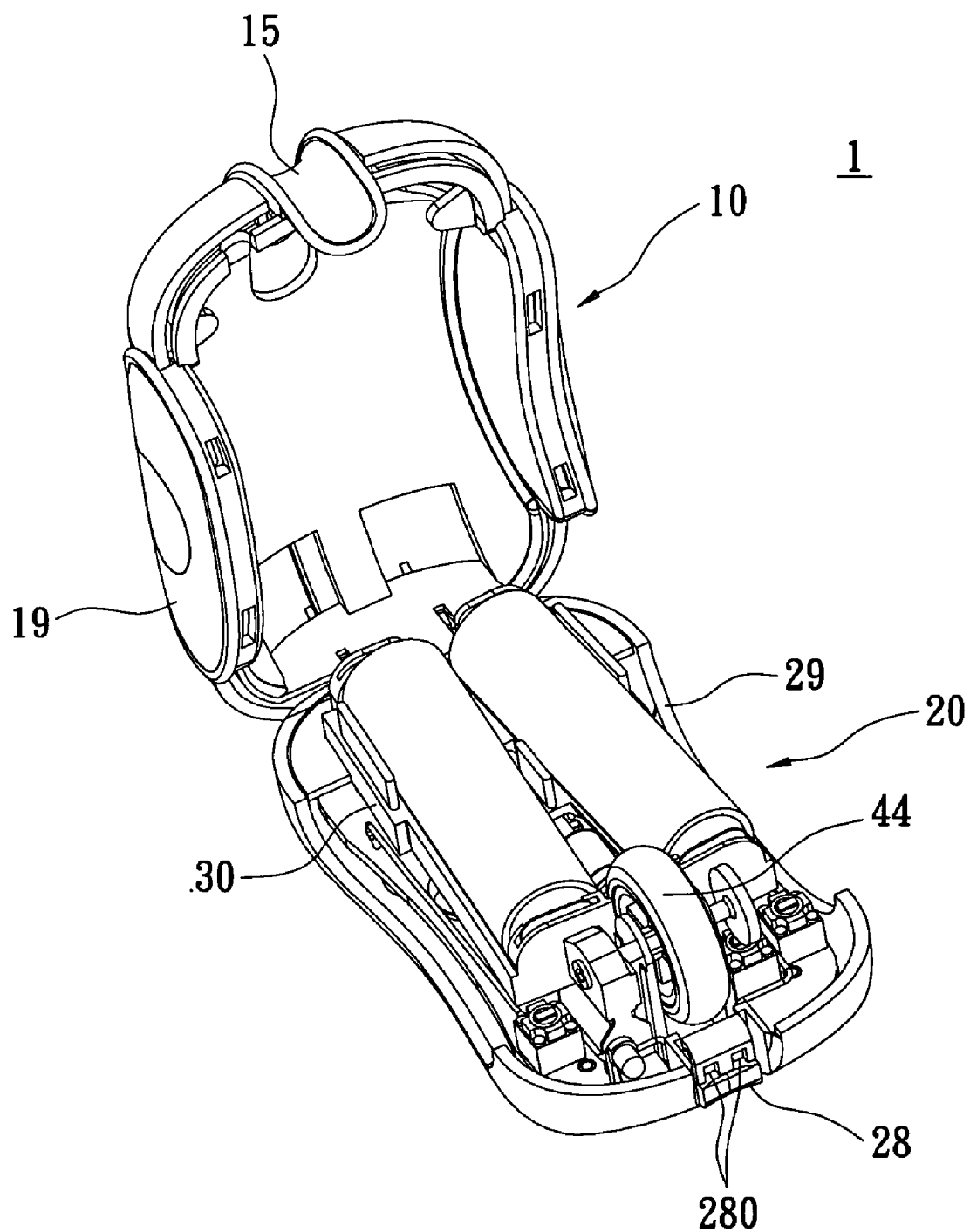
FIG. 4 is a perspective assembling view of the improved mouse structure of the present invention in an uncovered condition.
Figure 5:
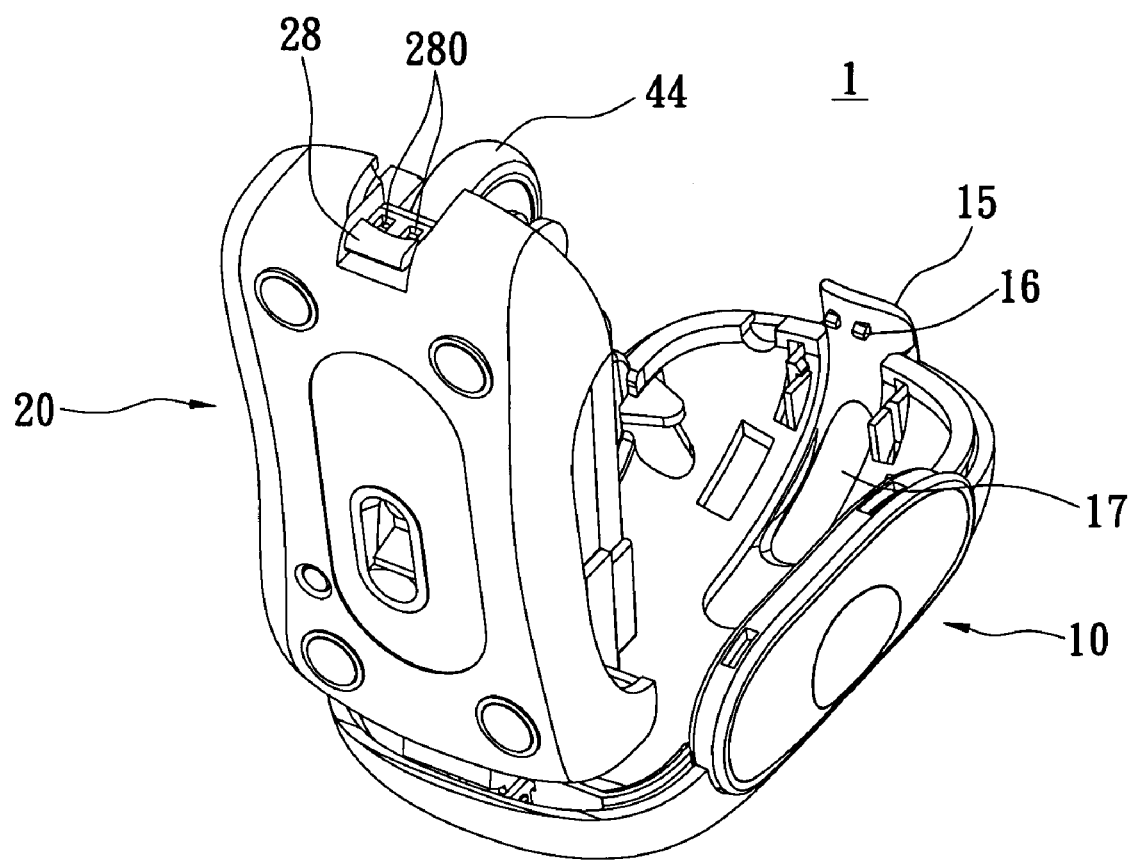
FIG. 5 is another perspective assembling view of the improved mouse structure of the present invention in an uncovered condition.
Figure 6:
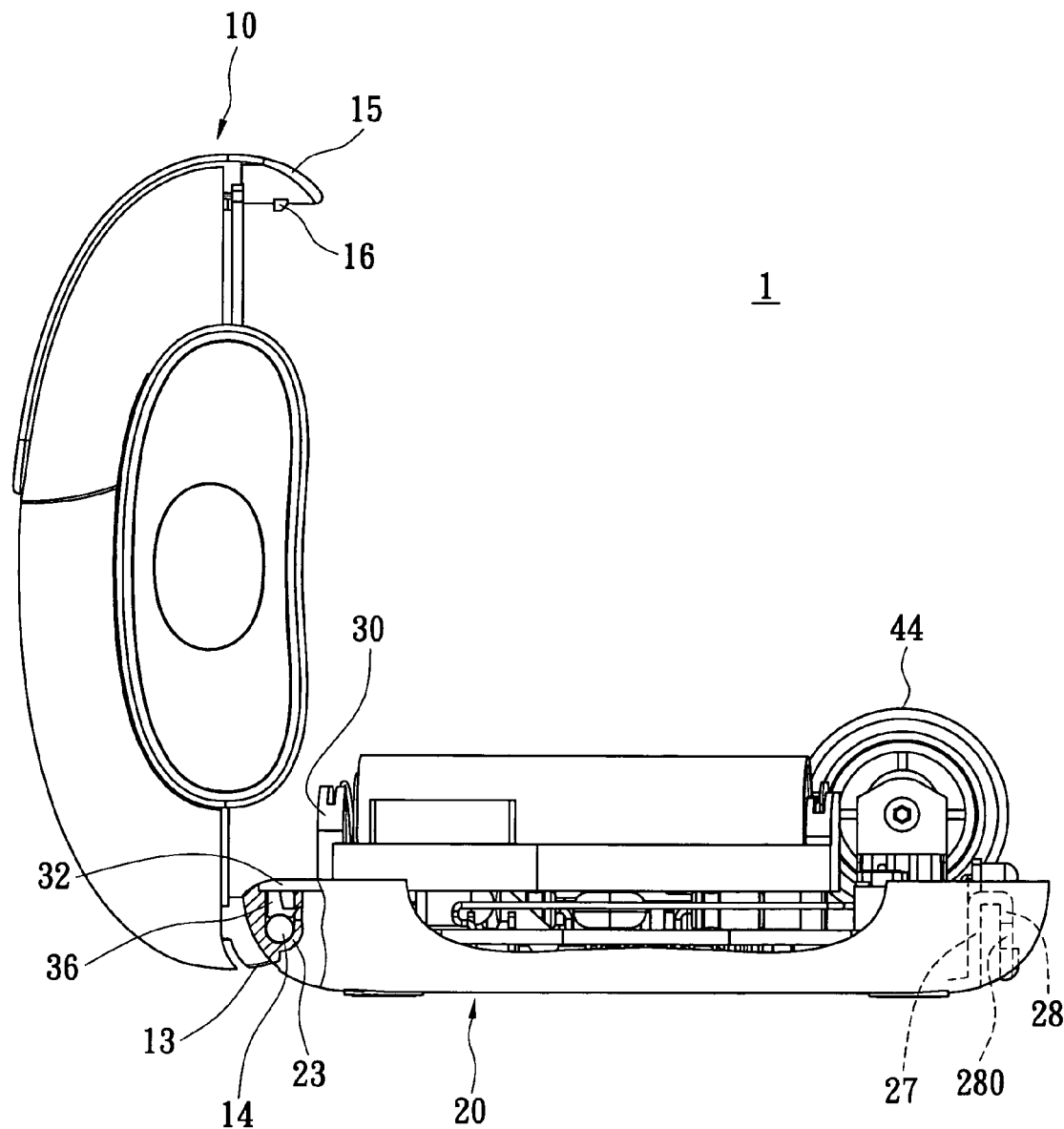
FIG. 6 is a side view of the improved mouse structure of the present invention in an uncovered condition.
Figure 7:
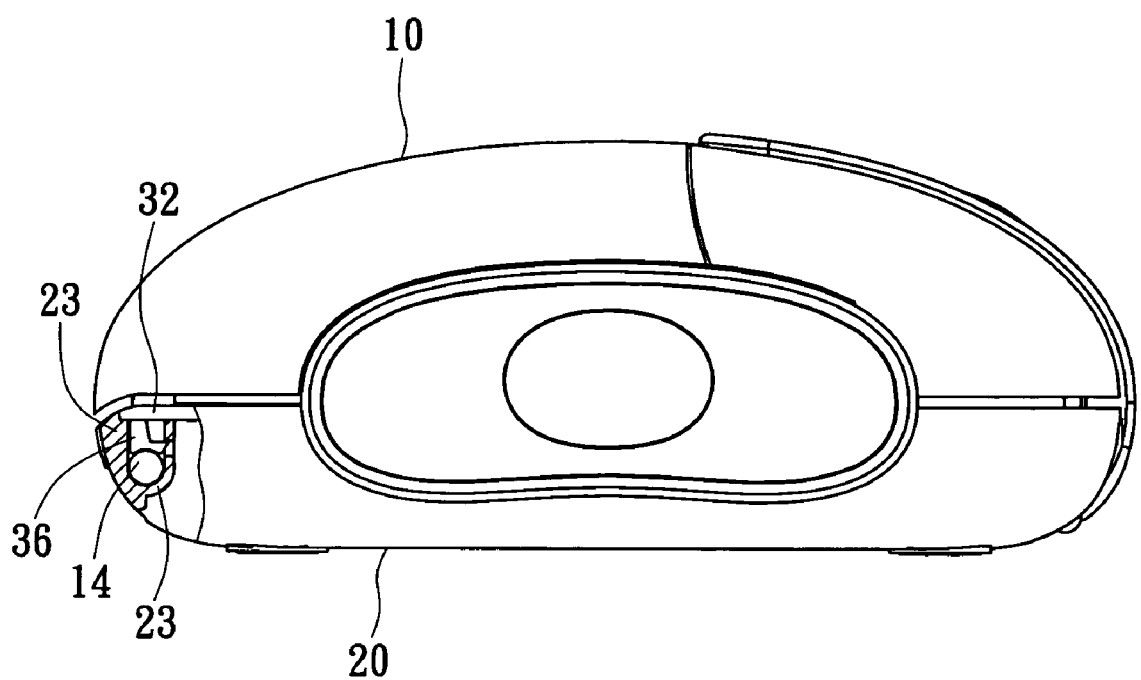
FIG. 7 is a side view of the improved mouse structure of the present invention in a covered condition.

Referring to FIG. 4, the engaging seat 25 is generally U-shaped, and has two side walls 26 extending inwardly from a front portion of the base 20, an inner wall 27 connecting with the two side walls 26, and a locking plate 28 extending forwardly and downwardly from a top of the inner wall 27. The engaging hole 280 is formed in the locking plate 28.

A distinguishing feature of the mouse 1 is that the mouse 1 has a V-shaped battery seat 30 disposed therein. The battery seat 30 comprises a front gap 32 formed in a front portion thereof for receiving a portion of the wheel 44; the mouse is reduced a predetermined lengthwise length thereby. Also, the cover 10 is an elliptically curved shell formed with a concave space therein. The battery seat 30 is received in the concave space, fully utilizing space and reducing the total volume.

The battery seat 30 has two tail portions 34 formed on two side of an end thereof. Each tail portion 34 has a fixing portion 36 extending downwardly and engaging the U-shaped seat 23 for retaining the pivoting shafts 14 in the U-shaped seat 23 to utilize fully the element without another fixing element. A PCB (printed circuit board) 40 of the mouse 1 is disposed under the battery seat 30 and connected with the base 20. The PCB 40 has a board 42 and a light source 46 disposed on the board 42. The light source 46 usually is a LED 46.

The mouse 1 further comprises a lens 50 which is assembled under the PCB 40 for guiding light from the light source 46 through a light hole 52 to the surface where the mouse rests on. The light hole 52 is formed on the base 20.

The cover 10 of the improved mouse structure 1 further comprises a pair of side boards 19 respectively disposed on two sides thereof. Each side board 19 is formed with a concave portion 191 for gripping. By pressing the pair of side boards 19 of the mouse 1, the cover 10 is compressed inwardly and the hook 16 moves forward and out the engaging hole 280. Therefore, the present invention allows quicker battery exchange. The side boards 19 can be elliptical in shape and the base 20 is formed with two U-shaped side grooves 29 in two sides thereof for receiving the side boards 19 therein.

In summary, the characteristics and advantages of the present invention are as follows:

1. The present invention of the improved mouse structure provides an improved method of arrangement for the inner elements of the mouse so as to reduce the total volume and allow convenient carrying.

2. The present invention of the improved mouse structure provides a new method of assembly of which the cover is pivotally assembled with the base, so the mouse is assembled more quickly and the battery is exchanged more quickly. The present invention more effectively reduces the assembling time.

3. The present invention of the improved mouse structure does not need a lid to cover the battery; a mold for the lid is therefore unnecessary and the production cost is reduced.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. An improved mouse structure, comprising
a cover, being an elliptically curved shell with two ends, comprising a pivoting portion extending downwardly from one of the ends thereof, and a hook formed on another end thereof, the pivoting portion having an extending portion extending downwardly from an edge of the cover, and a pair of pivoting shafts respectively protruding outwardly from two ends of the extending portion;

a base, comprising a receiving portion formed on an end thereof for receiving the pivoting portion, an engaging seat formed on another end thereof, and an engaging hole formed on the engaging seat for engaging with the hook, the receiving portion of the base having a central recess for containing the extending portion, and two U-shaped seats respectively formed on two sidewalls adjacent the central recess, wherein each of the U-shaped seats is formed with a slot for receiving the pivoting shafts therein.

2. The improved mouse structure as in claim 1, wherein the cover further comprises a saddle formed with a wheel hole therein for containing and projecting a wheel, the saddle extends forwardly and downwardly for a predetermined length with a distal end, and the hook protrudes from an inner surface of the distal end of the saddle.

3. The improved mouse structure as in claim 1, wherein the pivoting portion further comprises a stopping portion protruding outwardly from an outside edge thereof, wherein when the cover is opened, the stopping portion stops the cover at a predetermined angle.

4. The improved mouse structure as in claim 1, wherein the mouse has a V-shaped battery seat disposed therein, the battery seat comprising a front gap for receiving a portion of the wheel, and the mouse is reduced by a predetermined lengthwise length.

5. The improved mouse structure as in claim 4, wherein the battery seat has two tail portions formed on two side of an end thereof, each tail portion has a fixing portion extending downwardly and engaging the U-shaped seat for retaining the pivoting shafts in the U-shaped seat.

6. The improved mouse structure as in claim 5, further comprising a PCB (printed circuit board) disposed under the battery seat and connected with the base.

7. The improved mouse structure as in claim 6, further comprising a transparent lens assembled under the PCB for guiding light from the light source to the surface where the mouse rests on.

8. The improved mouse structure as in claim 1, wherein the cover further comprises a pair of side boards respectively disposes on two sides of the cover, and each side board is formed with a concave portion for gripping, and when the pair of side boards are pressed, the cover compresses inwardly and the hook moves forwardly and out of the engaging hole.

9. The improved mouse structure as in claim 8, wherein the base is formed with two U-shaped side grooves in two sides thereof for receiving the side boards therein.

10. The improved mouse structure as in claim 1, wherein the engaging seat is generally U-shaped, and has two side walls extending inwardly from a front portion of the base, an inner wall connecting with the two side walls, and a locking plate extending forwardly and downwardly from a top of the inner wall, wherein the engaging hole is formed in the locking plate.

* * * * *